United States Patent [19]

Fagnani, Jr. et al.

[11] Patent Number: 4,506,840
[45] Date of Patent: Mar. 26, 1985

[54] BAFFLE MEANS FOR FORAGE HARVESTERS

[75] Inventors: Matthew V. Fagnani, Jr.; Wayne B. Martenas, both of New Holland, Pa.

[73] Assignee: Sperry Corporation, New Holland, Pa.

[21] Appl. No.: 528,015

[22] Filed: Aug. 31, 1983

[51] Int. Cl.³ .............................................. B02C 18/22
[52] U.S. Cl. ................................ 241/101.7; 241/167; 241/222; 241/285 B
[58] Field of Search ............. 241/101.7, 260.1, 285 R, 241/166, 285 A, 167, 285 B, 101 B, 186 A, 222, 224, 246, 247, 189 R, 73

[56] References Cited

U.S. PATENT DOCUMENTS

| | | |
|---|---|---|
| 3,132,459 | 5/1964 | Grillot . |
| 3,159,958 | 12/1964 | Mathews . |
| 3,224,688 | 12/1965 | Beiter .......................... 241/189 R X |
| 3,525,375 | 8/1970 | Heising et al. . |
| 3,677,316 | 7/1972 | Markham . |
| 3,904,134 | 9/1975 | Olson ................................. 241/73 |
| 4,028,779 | 6/1977 | Shah ................................... 241/73 |
| 4,252,281 | 2/1981 | Storm et al. ...................... 241/222 |
| 4,278,211 | 7/1981 | Shriver ............................. 241/222 |
| 4,312,481 | 1/1982 | Carey et al. ..................... 241/101.7 |

*Primary Examiner*—Mark Rosenbaum
*Attorney, Agent, or Firm*—Darrell F. Marquette; Frank A. Seemar; Larry W. Miller

[57] ABSTRACT

In a forage harvester having a cutterhead and an auger to move crop material away from the cutterhead, baffle means are provided to prevent material from being thrown from the auger toward the cutterhead. The baffle means is located above the auger and behind the cutterhead in order to deflect material downwardly toward the auger.

6 Claims, 4 Drawing Figures

BAFFLE MEANS FOR FORAGE HARVESTERS

BACKGROUND AND SUMMARY OF THE INVENTION

Forage harvesters generally include feed rolls which deliver crop material to a cutterhead where it is cut and chopped. A conveying auger is also usually provided to move the cut and chopped material from the cutterhead area to a blower where it is discharged through a spout.

In a conventional type of forage harvester, such as disclosed in U.S. Pat. No. 4,278,211, the conveying auger is located in a trough rearward of the cutterhead. Material is delivered from the cutterhead into the auger trough with such high force that frequently a considerable amount of the material is thrown around the auger and back into the cutterhead. This greatly reduces the efficiency of the harvester in moving material away from the cutterhead area.

The present invention provides baffle means located above the auger and behind the cutterhead to prevent material from being thrown from the auger toward the cutterhead. The baffle means actually deflects material downwardly toward the auger. This significantly improves the efficiency of the harvester in moving the material away from the cutterhead area.

DESCRIPTION OF THE PREFERRED EMBODIMENT

Figure 1:
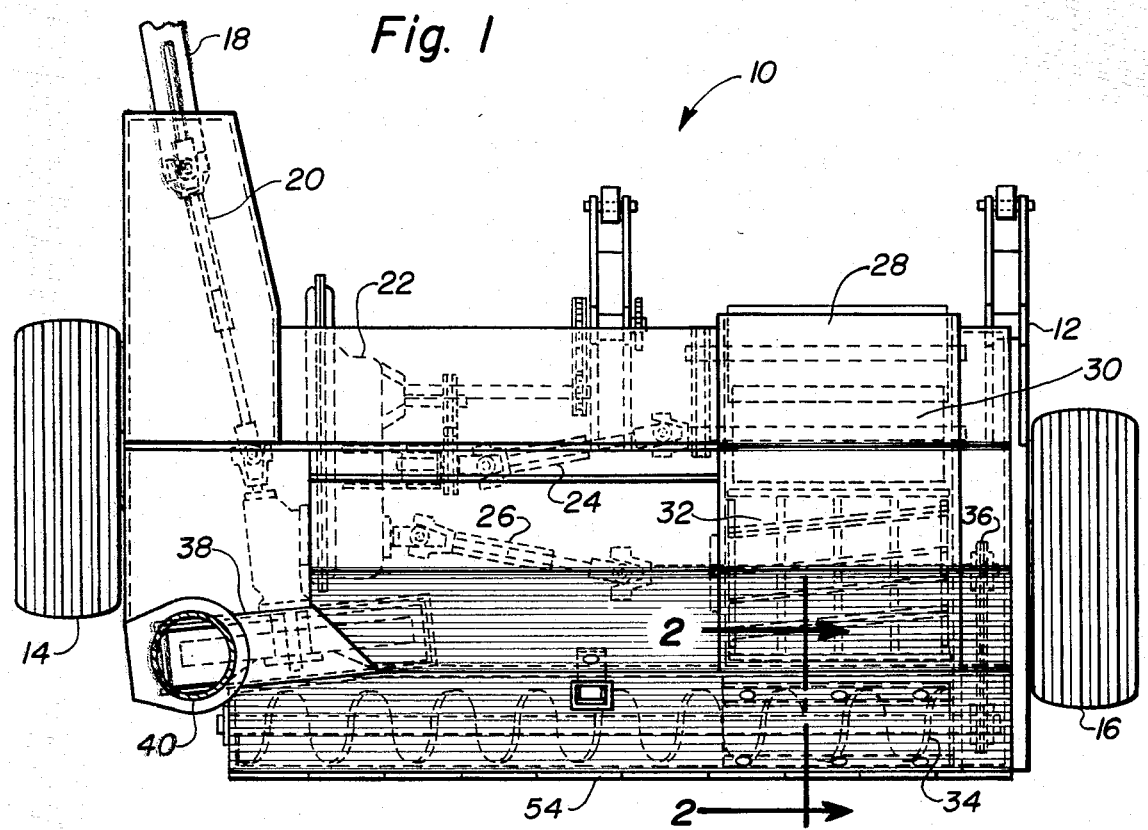
FIG. 1 is a plan view of a forage harvester incorporating the preferred embodiment of the baffle means of the present invention.

Referring to FIG. 1, a forage harvester 10 includes a base frame 12 supported by wheels 14 and 16. A tongue 18 is pivotally mounted on the base frame 12 for connection to a tractor (not shown). An input drive shaft 20 is adapted for connection to the PTO of a tractor in order to deliver power through a gearbox 22 to transverse shafts 24 and 26. Feed rolls 28 and 30 are rotated by the shaft 24 while a cutterhead 32 is rotated by the shaft 26. The cutterhead 32 includes a plurality of knives mounted around its periphery. An auger 34 is driven from the cutterhead 32 by a chain or belt 36. The auger 34 includes spiralled flighting mounted along the length thereof. A blower unit 38 is driven directly from the gearbox 22.

In operation, the feed rolls 28 and 30 deliver crop material to the cutterhead 32 where it is cut and chopped. Then, the auger 34 moves the cut and chopped material away from the area around the cutterhead 32 across the base frame 12 to the blower unit 38 for discharge outwardly through a spout 40.

Figure 2:
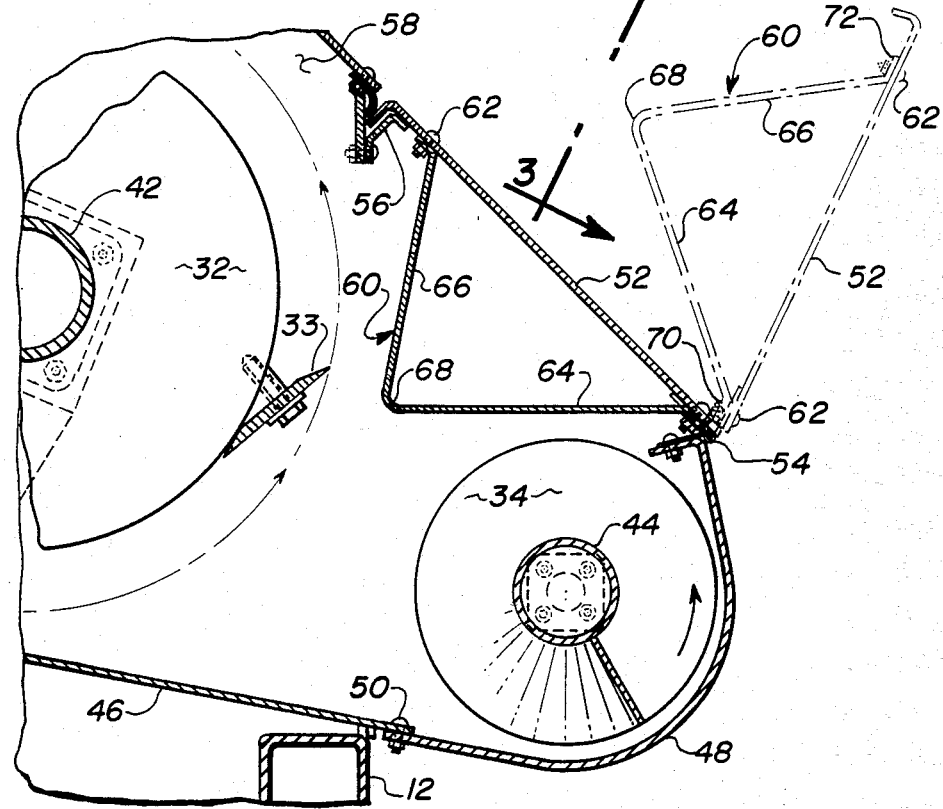
FIG. 2 is an enlarged sectional view taken along lines 2—2 in FIG. 1.
Figure 3:
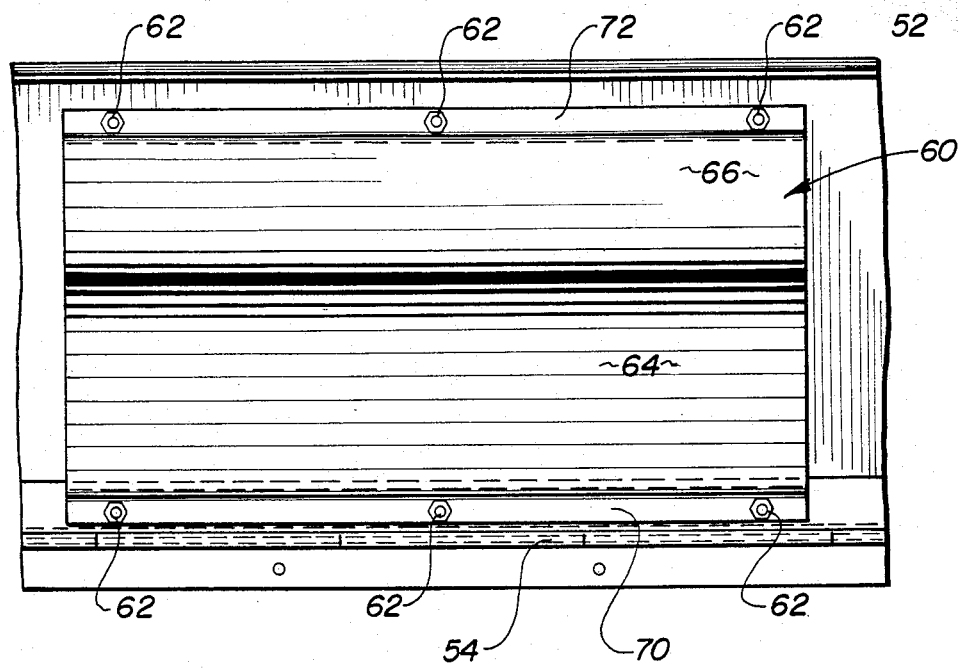
FIG. 3 is a view taken along lines 3—3 in FIG. 2.
Figure 4:
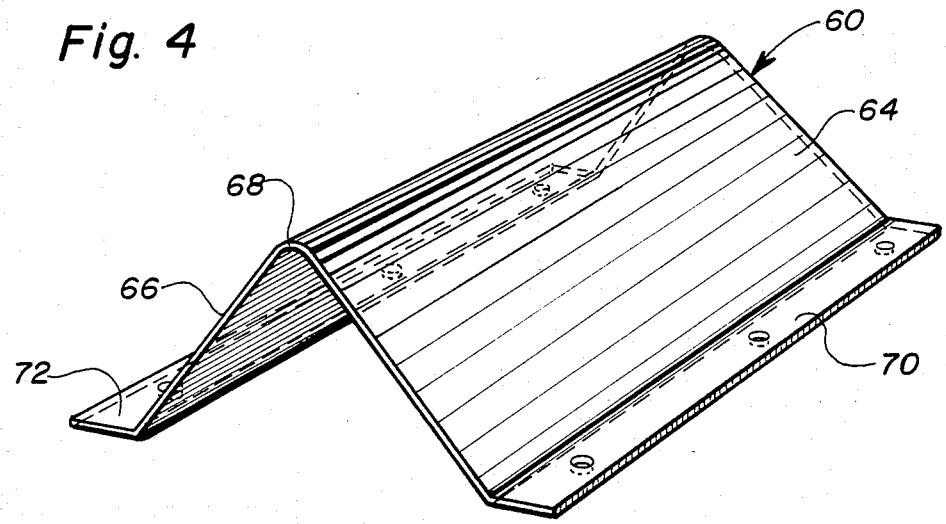
FIG. 4 is a perspective view of a baffle and stripper member according to the present invention.

Referring now to FIG. 2, it will be seen that the cutterhead 32 has a central shaft 42 and the auger 34 has a central shaft 44. A flat panel 46 supported on the base frame 12 extends underneath the cutterhead 32. A curved panel 48 is bolted at 50 to the flat panel 46 and forms a trough in which the auger 34 is disposed. A cover panel 52 is connected to the curved panel 48 by a hinge 54 for movement between a closed position shown in full lines and an open position shown in phantom. The curved panel 48 and the cover panel 52 extend the full length of the auger 34. The cover panel 52 rests on an angle member 56 when in the closed position. The angle member 56 is secured to another flat panel 58 that extends along the side of the cutterhead 32.

According to the present invention, a baffle and stripper member 60 is secured by bolts 62 to the underside of the cover panel 52 directly behind the cutterhead 32. The baffle and stripper member 60 is substantially V-shaped in cross-section as seen in FIG. 2, with flat portions 64 and 66 connected by a bight portion 68. The baffle and stripper member 60 also includes flanges 70 and 72 through which the bolts 62 extend. Preferably, the baffle and stripper member 60 is the same length as the cutterhead 32.

During normal harvesting operation of the forage harvester 10, the cover panel 52 is disposed in its closed position shown in full lines in FIG. 2. With the cover panel 52 in this position, the baffle and stripper member 60 is situated, as also shown in full lines in FIG. 2, so that the flat portion 64 thereof is substantially horizontal and extends over part of the auger 34. The auger 34 is rather closely confined at the bottom and the rear by the curved panel 48 and at the top by the flat portion 64 of the baffle and stripper member 60. Material is delivered from the cutterhead 32 into the trough containing the auger 34. As the material is moved through the trough away from the area behind cutterhead 32, the flat portion 64 of the baffle and stripper member 60 effectively prevents the material from being thrown out of the trough in a direction back toward the cutterhead 32 by actually deflecting such material downwardly toward the auger 34. This significantly improves the efficiency of the harvester 10 in moving material from the cutterhead 32 to the blower unit 38. When the cover panel 52 is disposed in its closed position shown in full lines in FIG. 2, the bight portion 68 of the baffle and stripper member 60 effectively strips material from the cutterhead knives 33 and directs the material downwardly toward the auger 34. This helps to improve the cutting efficiency of the cutterhead 32. The purpose of the flat portion 66 of the baffle and stripper member 60 is to prevent debris from building up on the top of the other flat portion 64.

If it is desired to service or inspect the cutterhead 32 and the auger 34, the cover panel 52 may be moved to its open position shown in phantom in FIG. 2. Since the baffle and stripper member 60 is secured to the cover panel 52, it moves out of the way providing easy, unobstructed access to the cutterhead 32 and the auger 34.

In its preferred embodiment, the baffle and stripper member 60 is situated, during normal harvesting operation, so that the flat portion 64 thereof lies in a substantially horizontal plane which is below the longitudinal axis of the cutterhead 32 as viewed in FIG. 2. The best results have been obtained with the flat portion 64 located approximately four inches below the longitudinal axis of the cutterhead 32 and approximately one inch above the top of the auger 34. The best location for the bight portion 68 of the baffle and stripper member 60 has been determined to be about two inches from the path of the cutterhead knives 33.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. In a forage harvester having a cutterhead for cutting and chopping crop material, and an auger for moving cut and chopped crop material away from said cutterhead, the improvement comprising:
   baffle means located generally above said auger and behind said cutterhead to prevent crop material from being thrown from said auger toward said cutterhead; and
   said baffle means including a substantially V-shaped member in cross-section having a pair of flat portions connected by a bight portion, one of said flat portions positioned to deflect crop material downwardly toward said auger, and said bight portion positioned to strip crop material from said cutterhead.

2. The improvement of claim 1, wherein said one flat portion lies in a substantially horizontal plane below the longitudinal axis of said cutterhead.

3. A forage harvester comprising:
   a cutterhead;
   an auger for moving crop material away from said cutterhead;
   a baffle and stripper member located behind said cutterhead and above said auger, said baffle and stripper member preventing crop material from being thrown from said auger toward said cutterhead and also stripping crop material from said cutterhead and directing it toward said auger; and
   said baffle and stripper member being substantially V-shaped in cross-section with a pair of flat portions connected by a bight portion, one of said flat portions of said baffle and stripper member preventing crop material from being thrown from said auger toward said cutterhead by deflecting crop material downwardly toward said auger, and said bight portion of said baffle and stripper member stripping crop material from said cutterhead and directing it toward said auger.

4. The forage harvester of claim 3 wherein said baffle and stripper member is movable to provide access to said cutterhead and said auger.

5. The forage harvester of claim 3, wherein the other flat portion of said baffle and stripper member prevents debris from building up on said one flat portion.

6. In a forage harvester having a cutterhead for cutting and chopping crop material, an auger disposed in a trough, and said trough being arranged to receive cut and chopped crop material from said cutterhead so that said auger may move the cut and chopped crop material through said trough away from said cutterhead, the improvement comprising:
   baffle means located generally behind said cutterhead and above said auger to deflect crop material downwardly toward said auger in order to prevent crop material from being thrown out of said trough in a direction toward said cutterhead; and
   said baffle means including a substantially V-shaped member in cross-section having a pair of flat portions connected by a bight portion, one of said flat portions positioned to deflect crop material downwardly toward said auger, and said bight portion positioned to strip crop material from said cutterhead.

* * * * *